United States Patent
Bohlmann et al.

[11] Patent Number: 6,144,646
[45] Date of Patent: Nov. 7, 2000

[54] METHOD AND APPARATUS FOR ALLOCATING CHANNEL ELEMENT RESOURCES IN COMMUNICATION SYSTEMS

[75] Inventors: Chad W. Bohlmann, Oak Park, Ill.; Bryan Jeffery Moles, Dallas, Tex.

[73] Assignee: Motorola, Inc., Schaumburg, Ill.

[21] Appl. No.: 09/343,318

[22] Filed: Jun. 30, 1999

[51] Int. Cl.[7] .............................. G08C 17/00; H04B 7/216
[52] U.S. Cl. ............................... 370/311; 455/69; 370/335
[58] Field of Search ..................................... 370/208, 252, 370/328, 329, 332, 331, 335; 455/69, 522

[56] References Cited

U.S. PATENT DOCUMENTS

| | | | |
|---|---|---|---|
| 5,893,035 | 4/1999 | Chen | 455/522 |
| 5,982,759 | 11/1999 | Jo et al. | 370/331 |
| 5,991,285 | 11/1999 | Ghosh | 370/335 |
| 6,034,971 | 3/2000 | Love et al. | 370/468 |

*Primary Examiner*—Ricky Ngo

[57] ABSTRACT

A communication system (200) includes a plurality of channel elements (201–05). A mobile station (101) communicates with a base station (114), both included in communication system (200), via a forward link (121) and a reverse link (122) communication. The communication system assigns a finite number (N) of channel elements (201–03) selected from plurality of channel elements (201–05) for forward link communication (121), inputs at least one forward link signal (210) associated with forward link (121) to each of N channel elements (201–03), determines a power gain requirement of forward link (121), adjusts power gain setting of each of N channel elements (201–03) such that an aggregate of power gain settings of N channel elements (201–03) substantially equals to the power gain requirement, outputs N forward link signals (231–33) with adjusted power gain accordingly, and combines N forward link signals (231–33) to form a combined forward link signal (250).

14 Claims, 2 Drawing Sheets

METHOD AND APPARATUS FOR ALLOCATING CHANNEL ELEMENT RESOURCES IN COMMUNICATION SYSTEMS

RELATED FIELD OF THE INVENTION

The invention generally relates to communication systems, and in particular, to a code division multiple access communication system.

BACKGROUND OF THE INVENTION

Hardware or software failure of a communication system has negative effects on the communication system performance. Uninterrupted communication services during a call or standby mode are sought-after attributes of a communication system. Hardware failure in particular would cause long delays in restoring the communication services.

Referring to FIG. 1, a simplified block diagram of a communication system 100 is shown. The communication system 100 may include a number of mobile stations such as mobile stations 101–02, more mobile stations are also possible, but here only two are shown, and a cell site 110 that may be divided into a number of sectors, such as sectors 111–13. Each mobile station communicates with the cell site 110, through at least one of the sectors, via a forward wireless link 121 and a reverse wireless link 122. Each sector would have associated hardware, such as base transceiver stations (BTS) 114–16. The BTSs 114–16 are connected to a base station controller (BSC) 117 that controls the operation of the BTSs 114–16, among other functions. The BSC 117 is connected to other networks or public switching network collectively shown at a block 199.

In each BTS, there are a number of hardware elements coupled with controlling software that provide the interface between the mobile stations and the remaining parts of the cell site. In particular, each BTS has a number of channel elements where each channel element provides hardware and software resources for controlling a communication link. Each communication link comprised of a forward link, a link from the BTS to the mobile station, and a reverse link, a link from the mobile station to the BTS. A channel element provides functions of the forward link encoding and modulation, data symbols addition (puncturing), and forward power gain adjustment. In addition, each channel element provides functions of the reverse link demodulation, frame quality determination, and reverse power control. A channel element may perform other functions. A BTS may have a number of channel elements. Few of the channel elements may not be in use some of the time. When a channel element fails in the communication system, the communication link that is serviced by the failed channel element is interrupted or terminated even though the link may have been serviced by other channel elements in the BTS.

Therefore, there is a need for method and apparatus in a communication system for allocating channel elements to a communication link such that failure of one channel element does not terminate or interrupt the communication link.

DETAILED DESCRIPTION OF THE PREFERRED EMBODIMENT(S)

Figure 1:
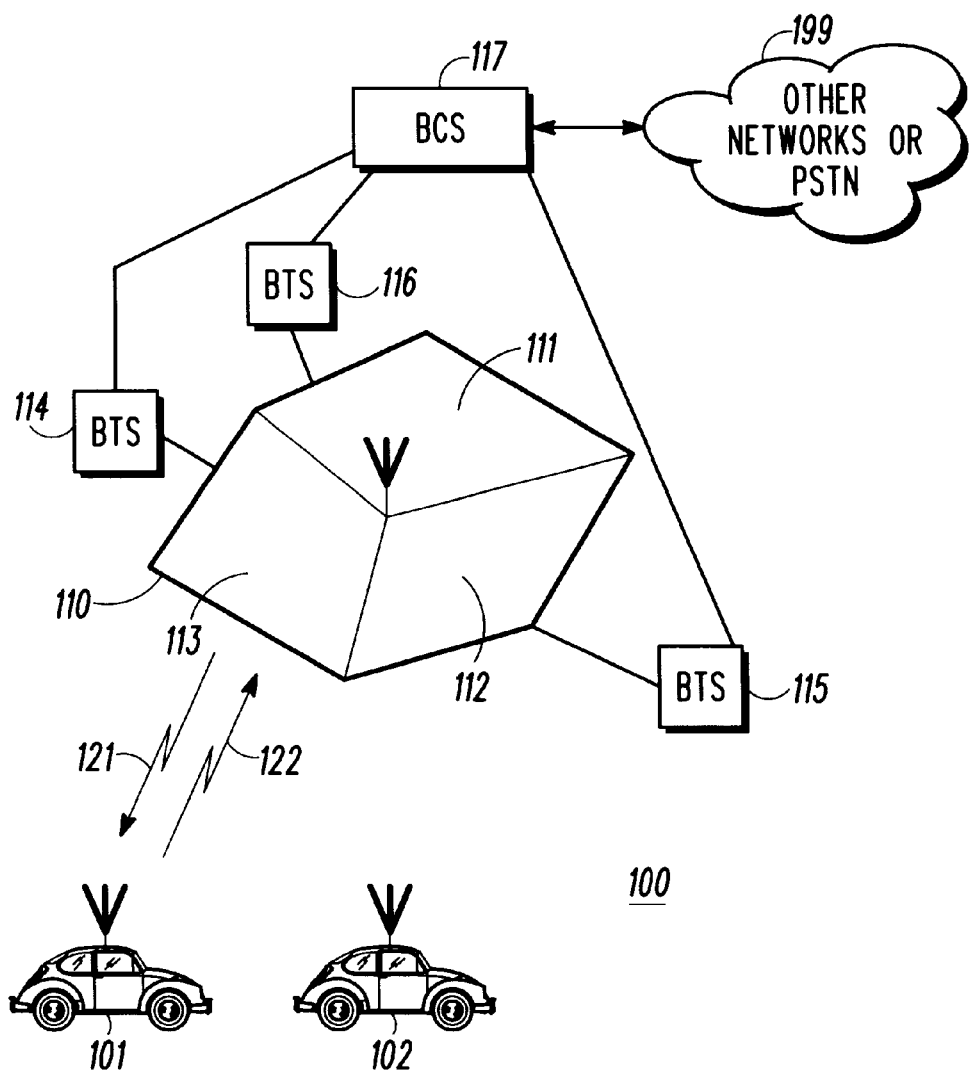
FIG. 1 depicts a block diagram of a communication system.
Figure 2:
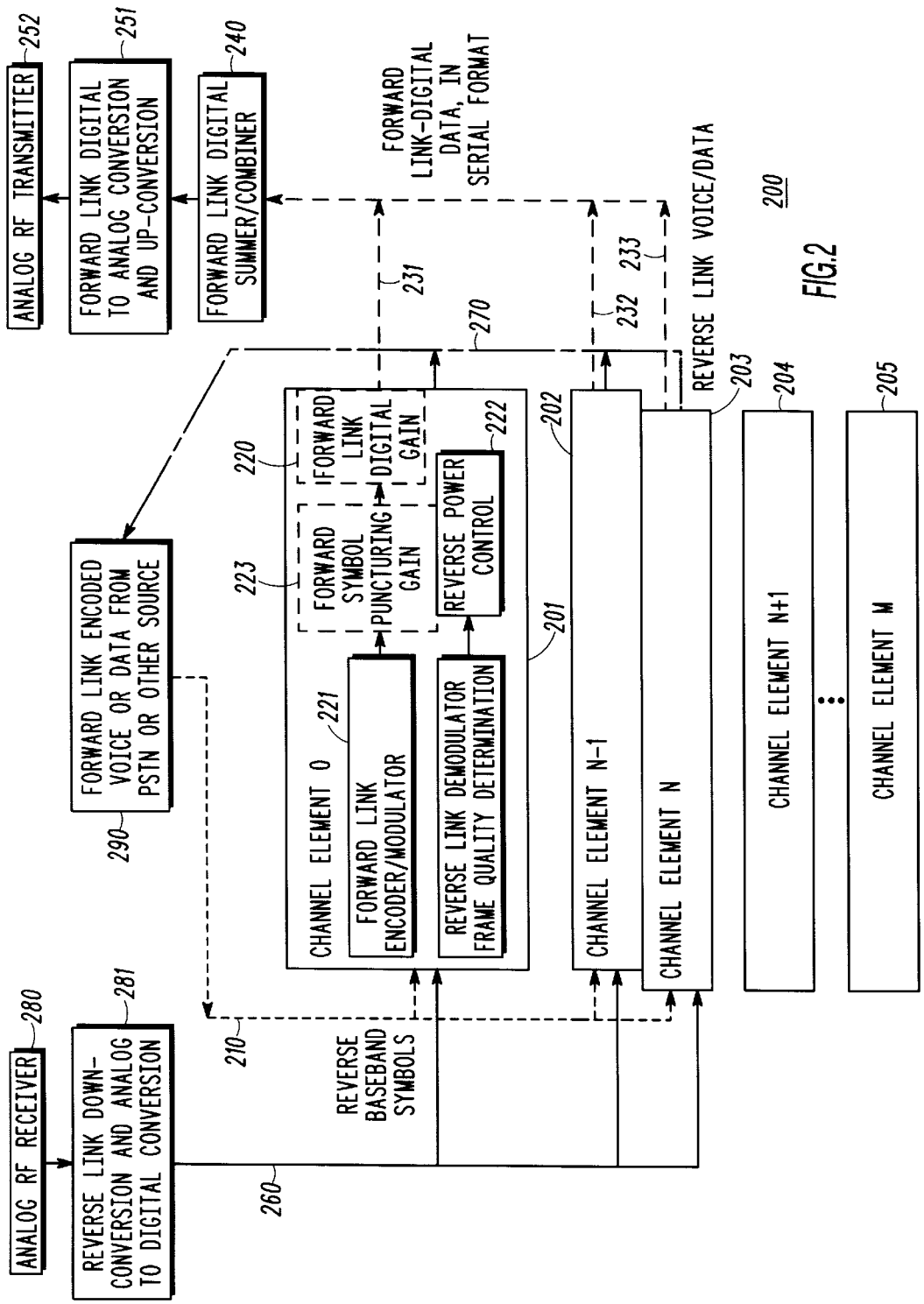
FIG. 2 depicts detailed block diagram of a communication system according to various aspects of the invention.

Referring to FIG. 2, one or more aspects of the invention are shown in a communication system 200. The communication system 200 includes at least a base transceiver station (BTS), such as BTSs 114–16 shown in FIG. 1. Each BTS may have a plurality of channel elements, such as channel elements 201–05, representing channel elements 0 through N and N+1 through M. According to the invention, for a forward link communication between a mobile station and a base station, the communication system assigns a finite number (N) of channel elements, channel elements 201–03, selected from the plurality of channel elements, 0 through M, 201–05, for services of the forward link. The communication system inputs at least one forward link signal 210 associated with the forward link communication to each of the N channel elements 201–203. The forward link signal 210 may be generated by a block 290 that encodes forward link voice or data from a public switching network or other sources.

The communication system determines a power gain requirement of the forward link communication. A power control sub-channel is continuously transmitted on the forward link traffic channel. The sub channel transmits at a rate of one bit, at least, every 1.25 mSec. A zero bit may indicate to the mobile station to increase the mean power output on the reverse link, and a bit 1 may indicate to decrease the reverse link power level. On the reverse link traffic channel, the base station receives and measures signal strength of the reverse link signal transmitted from the mobile station. The base station then determines the value of the power control bit. The mobile station, may in a different situation, transmits on the reverse link signal strength measurement of a forward link to the base station. The base station may use the mobile assisted signal strength measurement to determine the value of the control bit. In addition, the power level of the signals and gain obtained from coding of the channels may set the power gain requirements.

Each channel element has at least a forward link digital gain adjustment block 220. The power gain setting of each of the N channel elements 201–03 are adjusted such that an aggregate of power gain settings of the N channel elements 201–03 substantially equals to the determined power gain requirement. The N channel elements 201–03 output N forward link signals 231–33 with adjusted power gain accordingly.

The N forward link signals 231–33 input a forward link digital summer and combiner 240 for combining to form a combined forward link signal 250. The combined forward link signal 250 inputs a digital to analog up-conversion block 251 for proper carrier frequency translation and amplification which ultimately transmitted from an analog transmitter 252 to the mobile station. As such, when at least one of the channel elements 201–03 fails for any reason, the forward signal is minimally effected. The effect is reduction in power gain of the combined signal proportional to the power gain contributed by the failed channel element.

The adjustment of forward power gain may include adjusting power gain setting of each of the N channel elements 201–03 in substantially equal parts such that the aggregate of power gain settings of the N channel elements 201–03 substantially equals to the power gain requirement. In this case, failure of one channel element has only a factor of 1/N effect in reduction of the amplitude gain. To translate the power gain reduction one ordinary skilled in the art may find that the reduction in power gain may be governed by the following relationship:

Power Gain Reduction=20 log (N−1/N).

For example, in case N is equal to 4 and one of the channel elements fails, the power gain reduction is approximately equals to 2.50 dB. The reduction in power gain of approximately 2.5 may be recovered through a power gain adjustment very quickly without interruption of communication services.

In case the communication system is a code division multiple access communication system, the communication system assigns an orthogonal code to the N channel elements 201–03 for coding the input forward link signal 210, at encoder 221 in case of channel element 201, to produce N coded forward link signals 231–33 with adjusted power gain.

On the reverse link, the communication system receives at the N channel elements 201–03 a reverse link signal 260 from the mobile station. The reverse link signal 260 is in digital format. The signal that was received from the mobile station may be in analog format at an analog radio frequency receiver 280. The received signal may be down converted to digital format at 281. The communication system selects a first channel element, such as channel element 201, from the N channel elements 201–03 for a processing of the reverse link signal 260. The processed signal outputted via output 270 and routed to block 290. In case the communication system detects failure of the first selected channel element 201, the communication system substitutes the processing of the reverse link signal 260 from the first selected channel element 201 to a second channel element, such as channel element 203, selected from the N channel elements excluding the first selected channel element 201. As such, the reverse communication link would not suffer interruption or termination when the first channel element 201 fails to operate. Detection of failure of a channel element may be through detection of failure of a frame quality determination of the reverse link signal at the first or other channel elements of the N channel elements 201–03.

For reverse power control, the communication system determines at 222 power level adjustment of the reverse link signal from the information received from the mobile station. The communication system selects a first channel element, such as channel element 201, from the N channel elements 201–03 to add at 223 at least one power level control data bit having a value according to the power level determination to information data transmitted via forward link signal. The communication system when detects failure of the selected first channel element substitutes a second channel element selected from the N channel elements excluding the first channel element to add at least the power level control data bit having a value according to the power level determination. Each and every portion of the invention may be performed by software, hardware, or a combination of software and hardware. In particular, use of digital signal processor for such implementation is well known in a relevant art.

What is claimed is:

1. In a communication system that includes a base station having a plurality of channel elements, a method for communicating between a mobile station and said base station comprising the steps of:

assigning a finite number (N) of channel elements selected from said plurality of channel elements for a forward link communication from said base station to said mobile station;

inputting at least one forward link signal associated with said forward link communication to each of said N channel elements;

determining a power gain requirement of said forward link communication;

adjusting power gain setting of each of said N channel elements such that an aggregate of power gain settings of said N channel elements substantially equals to said power gain requirement;

outputting N forward link signals with adjusted power gain according to said adjusting step from correspondingly said N channel elements;

combining said N forward link signals to form a combined forward link signal.

2. The method as recited in claim 1 wherein said adjusting power gain includes adjusting power gain setting of each of said N channel elements in substantially equal parts such that said aggregate of power gain settings of said N channel elements substantially equals to said power gain requirement.

3. The method as recited in claim 1, wherein said communication system is a code division multiple access communication system, further comprising the step of:

assigning an orthogonal code to said N channel elements for coding said input forward link signal to produce N coded forward link signals with adjusted power gain according to said adjusting step from correspondingly said N channel elements.

4. The method as recited in claim 1 further comprising the steps of:

receiving at said N channel elements a reverse link signal from said mobile station;

selecting a first channel element from said N channel elements for a processing of said reverse link signal.

5. The method as recited in claim 4 further comprising the steps of:

detecting failure of said first selected channel element;

substituting, following said detecting failure, said processing of said reverse link signal from said first selected channel element to a second channel element selected from said N channel elements excluding said first selected channel element.

6. The method as recited in claim 1 further comprising the steps of:

determining power level adjustment of a reverse-link signal from said mobile station;

selecting a first channel element from said N channel elements to add at least one power level control data bit having a value according to said determining step to information data transmitted via said forward link signal.

7. The method as recited in claim 6 further comprising the steps of:

detecting failure of said selected first channel element;

substituting a second channel element selected from said N channel elements excluding said first channel element to add at least said power level control data bit having a value according to said determining step to information data transmitted via said forward link signal.

8. In a communication system that includes a base station having a plurality of channel elements, an apparatus for communicating between a mobile station and said base station comprising:

means for assigning a finite number (N) of channel elements selected from said plurality of channel elements for a forward link communication from said base station to said mobile station;

means for inputting at least one forward link signal associated with said forward link communication to each of said N channel elements;

means for determining a power gain requirement of said forward link communication;

means for adjusting power gain setting of each of said N channel elements such that an aggregate of power gain settings of said N channel elements substantially equals to said power gain requirement;

means for outputting N forward link signals with adjusted power gain according to said adjusting step from correspondingly said N channel elements;

means for combining said N forward link signals to form a combined forward link signal.

9. The apparatus as recited in claim 8 wherein said means for adjusting power gain includes means for adjusting power gain setting of each of said N channel elements in substantially equal parts such that said aggregate of power gain settings of said N channel elements substantially equals to said power gain requirement.

10. The apparatus as recited in claim 8, wherein said communication system is a code division multiple access communication system, further comprising:

means for assigning an orthogonal code to said N channel elements for coding said input forward link signal to produce N coded forward link signals with adjusted power gain according to said adjusting step from correspondingly said N channel elements.

11. The apparatus as recited in claim 8 further comprising:

means for receiving at said N channel elements a reverse link signal from said mobile station;

means for selecting a first channel element from said N channel elements for a processing of said reverse link signal.

12. The apparatus as recited in claim 11 further comprising:

means for detecting failure of said first selected channel element;

means for substituting, following said detecting failure, said processing of said reverse link signal from said first selected channel element to a second channel element selected from said N channel elements excluding said first selected channel element.

13. The method as recited in claim 8 further comprising:

means for determining power level adjustment of a reverse-link signal transmitting from said mobile station;

means for selecting a first channel element from said N channel elements to add to information data transmitting via said forward link signal at least one power level control data bit having a value according to determination of said means for determining power level adjustment of a reverse-link signal.

14. The apparatus as recited in claim 13 further comprising:

means for detecting failure of said selected first channel element;

means for substituting a second channel element selected from said N channel elements excluding said first channel element to add at least said power level control data bit.

\* \* \* \* \*